United States Patent [19]
Moore

[11] 4,342,203
[45] Aug. 3, 1982

[54] COOLING FABRIC

[76] Inventor: Paul W. Moore, 152 Breckinridge Apartments, Pelham Rd., Greenville, S.C. 29615

[21] Appl. No.: 211,088

[22] Filed: Nov. 28, 1980

[51] Int. Cl.³ ............................................. B60H 3/04
[52] U.S. Cl. ..................................... 62/244; 296/210
[58] Field of Search .................. 296/211, 210; 62/244, 62/239, 259.1, 259.4

[56] References Cited

U.S. PATENT DOCUMENTS

| | | | |
|---|---|---|---|
| 2,151,097 | 3/1939 | Germonprez | 62/244 X |
| 3,585,812 | 6/1971 | Parker | 62/244 X |
| 3,917,340 | 11/1975 | Aquirre | 296/210 X |

FOREIGN PATENT DOCUMENTS

| | | | |
|---|---|---|---|
| 2139544 | 2/1973 | Fed. Rep. of Germany | 62/244 |
| 531987 | 8/1955 | Italy | 62/239 |

*Primary Examiner*—Lloyd L. King
*Attorney, Agent, or Firm*—Dority & Flint

[57] ABSTRACT

A cooling fabric including a composite layered member carried coextensive with the object to be cooled. The composite layered member includes a lower nonporous layer, a middle porous layer, and an upper permeable light reflective and soil resistant layer. Water conveying channels are interposed between the nonporous and the porous layers so that upon opening of a valve, water from a source is fed through the channels and migrates through the porous layer and cools the object by evaporating through the permeable layer. When permanently affixed to the roof of the vehicle, a drip pan is positioned below the roof of the vehicle for receiving condensate from the cooled air from within the vehicle.

8 Claims, 6 Drawing Figures

COOLING FABRIC

BACKGROUND OF THE INVENTION

Heretofore, the most common method of cooling objects such as automobiles is by use of power-driven air conditioners which utilize a substantial amount of energy. While air conditioners for automobiles work satisfactorily after the automobile has been running for a period of time, they have the inherent disadvantage of requiring a given period of time before they can effectively cool the interior of the vehicle. Frequently when a vehicle has been standing in the sun, the temperature depending on the exterior temperature will rise to extreme heights making it very uncomfortable to the driver of a vehicle for at least several minutes. As a result, when the vehicle is being used for short trips, the effectiveness of the air conditioner is substantially reduced.

While the windows of the vehicle can be rolled down to reduce the extreme heat of the air in the vehicle, it still requires a substantial period of time for the seats, dashboard, steering wheel, etc. to be reduced in temperature to a comfortable level.

Attempts have been made to provide sun shields for vehicles which can be stored on a roller within a cylindrical container for being drawn out through a slit and pulled over the automobile. One particular sun shield is disclosed in U.S. Pat. No. 3,992,053. In that particular patent, the sun shield includes a screen that has a reflective coating on the exterior thereof for reflecting the sun's rays.

In U.S. Pat. Nos. 3,785,697, 3,050,075, and 1,999,171 there are disclosed portable collapsible covers that can be readily extended over vehicles for protecting the vehicle from the elements.

In U.S. Pat. No. 2,201,984, there is disclosed a heated automobile blanket which can be draped over the entire vehicle. A heater is positoned adjacent one end of the material so that heated air can flow through spaces provided in the blanket for maintaining the vehicle heated.

SUMMARY OF THE INVENTION

This invention relates to a device for cooling objects exposed to sunlight and ambient heat such as parked or moving vehicles and also acts as a sun shield.

The invention is primarily concerned with providing means for maintaining the passenger compartment of vehicles such as automobiles below the ambient temperature with a minimum amount of energy. The device constructed in accordance with the present invention is particularly useful in the hotter areas of the world, and particularly on hot days.

The device is adapted to be placed on objects to be cooled such as a vehicle and includes a composite layered member which is placed coextensive with the object to be cooled. The composite layered member includes a permeable upper layer of material through which heat is radiated away from the vehicle by water evaporation. The outermost surface of this permeable layer is coated with a protective soil resistant film such a fluorinated resin. Below the permeable layer extends a porous inner layer of material through which water migrates laterally. On the bottom, there is a black rubberized nonporous layer which functions to contain the water and absorb heat from the vehicle. Water conveying channels are interposed between the porous layer and the lower nonpermeable black rubberized layer. Openings are provided in the channels providing communications between the channels and the porous layer of material. A source of water such as a pressurized tank is carried in the trunk of the vehicle and supplies water to the channels extending between the two layers of material. Heat sensitive valves are interposed between the source of water and the channels for controlling the flow of water to the channels responsive to the temperature of the object reaching a certain degree. In one particular embodiment, a time controlled valve is also used.

In one application, the layered material is permanently affixed on the roof of a vehicle and a water condensate collection pan is position directly therebelow. Normal upholstery is affixed to the lower side of the drip pan. A fan is used to circulate the air that is to be cooled between a space provided between the lower surface of the roof and the drip pan, although natural convection currents should be effective in providing air circulation while the vehicle is parked.

In another embodiment, the layered material is draped over the exterior of the vehicle with the nonporous black heat absorbing rubberized layer being positioned flush against the surface of the vehicle. The exterior permeable layer may have a reflective coating which reflects the sun's rays in addition to allowing water evaporation through its pores. The layered material is secured to the sides of the vehicle with Velcro strips or magnets sewn into the material. The cooling of the interior of the vehicle will be enhanced if the windows are left slightly open to allow cooling of the air within the vehicle directly against the heat absorbent layer of the material.

Accordingly, it is an important object of the present invention to provide a simple and efficient apparatus for cooling objects such as the interior of vehicles.

Another important object of the present invention is to provide an apparatus which can be readily positioned on vehicles for cooling the vehicle.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

DESCRIPTION OF A PREFERRED EMBODIMENT

Figure 1:
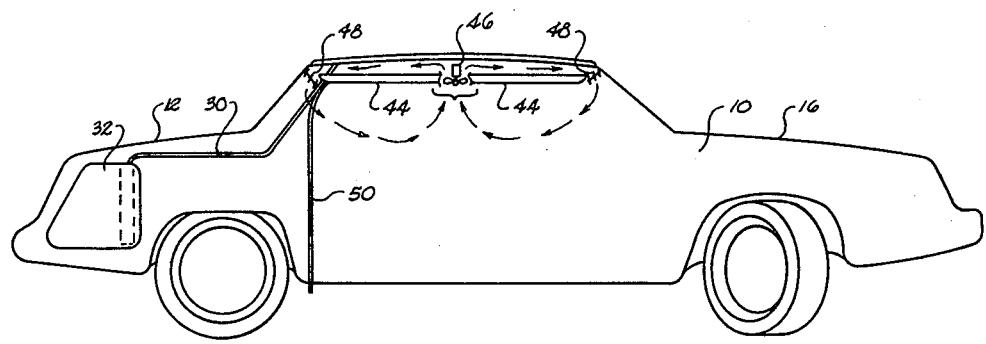
FIG. 1 is a side elevational view illustrating an apparatus constructed in accordance with the present invention mounted on the roof of a vehicle.
Figure 2:
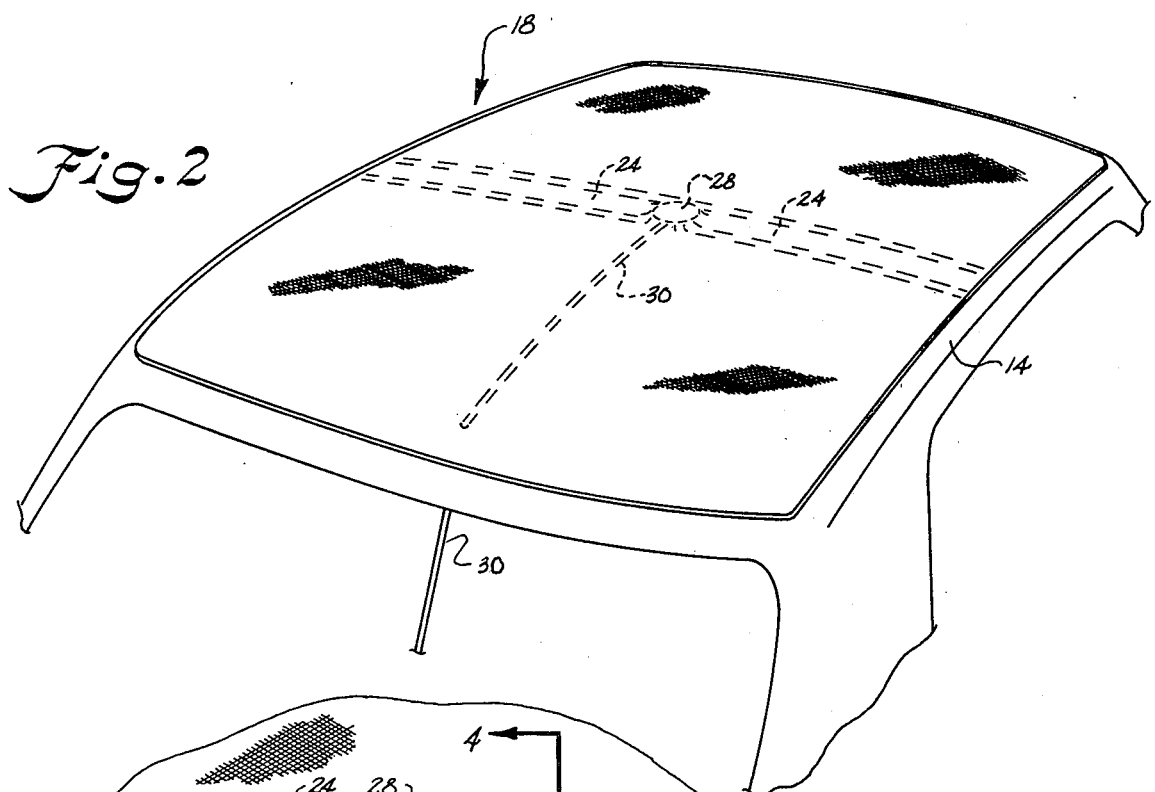
FIG. 2 is an enlarged prospective view showing the manner in which a composite layer is carried on a roof.
Figure 3:
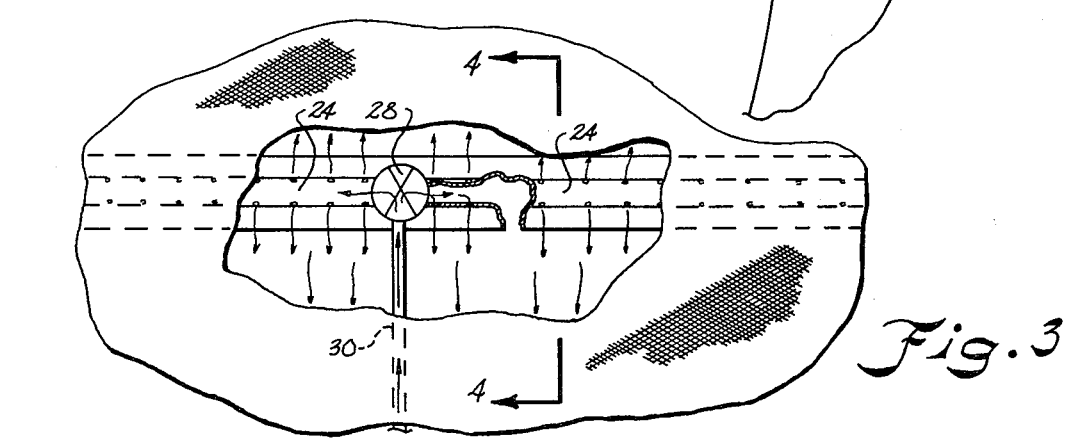
FIG. 3 is a plan view with parts broken away illustrating the composite layered member.
Figure 4:
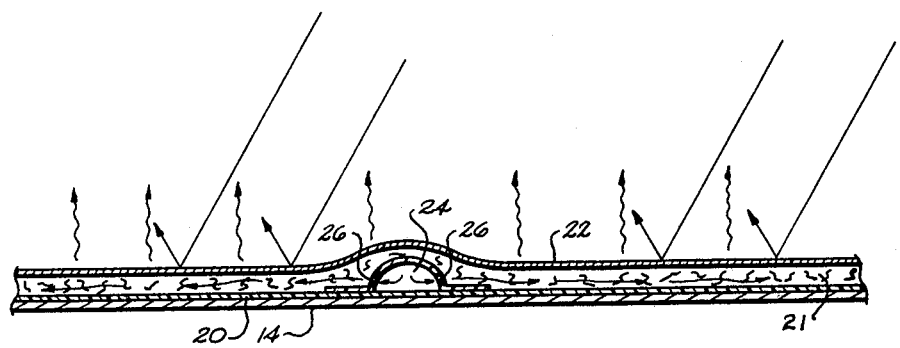
FIG. 4 is a sectional view taken along line 4—4 of FIG. 3.

Referring in more detail to FIG. 1 of the drawings, there is illustrated an object that is to be cooled which takes the form of an automobile 10. The automobile has a conventional trunk 12, roof 14, and hood 16, all of which are constructed of metal. Other features of the automobile such as the windows, doors, etc. are not illustrated for purposes of clarity. Positioned on top of the roof of the vehicle is a composite layered member generally designated by the reference character 18. The composite layered material 18 consists of a thin nonporous under layer 20 which contains the water over which is attached a porous layer 21 through which water may migrate freely. On top of the porous layer is a permeable layer 22 through which water can evaporate. The nonporous layer 20 is a thin black rubber construction. The porous layer 21 is a loosely woven or nonwoven polyester fabric. The permeable layer 22 consists of a micro-perforated vinyl coating or the porous layer fused to leave microsized openings. In particular, an aluminized coating is provided on the permeable layer for reflecting the sun's rays. Interposed between the lower nonporous layer 20 and the porous layer 21 are channels 24 constructed of any suitable material such as plastic tubing. The channels 24 have spaced openings 26 provided along the length thereof through which water is permitted to flow for engaging the porous layer 21.

A conventional heat sensing valve 28 is interposed between the channels 24 and a tube 30 extending from the roof of the vehicle down to the top of a pressurized tank 32 carried in the trunk of the vehicle. Upon the temperature of the roof of the vehicle reaching a predetermined temperature, the valve 28 automatically opens allowing water carried in the tube 30 to flow through the channels 24 for migrating through the porous layer of material 21.

Figure 6:
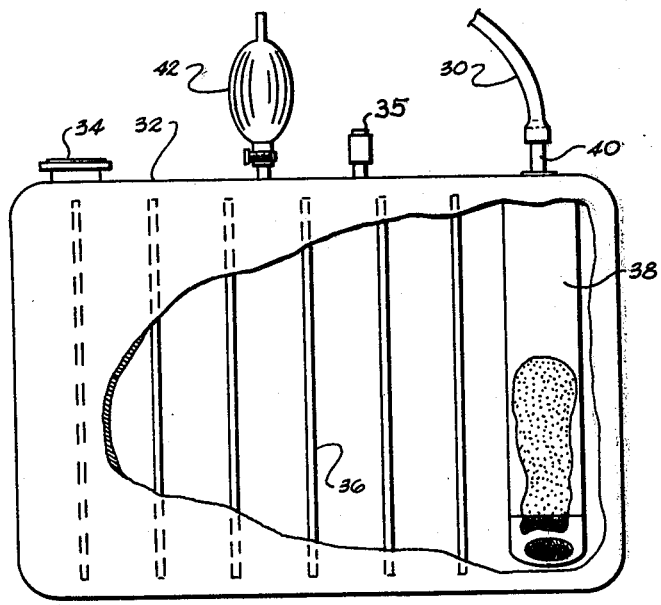
FIG. 6 is an enlarged elevational view with parts broken away illustrating a pressurized tank used in conjunction with the composite layered material.

The tank 32 may take the form of the tank shown in FIG. 6. The tank has a removable cap 34 provided on the top thereof through which water can be poured. Vertically extending baffle plates 36 are spaced along the tank for stabilizing the water in the tank. A filter 38 is positioned adjacent the right hand end of the tank and has an outlet nipple 40 communicating therewith. The tube 30 is connected to the outlet nipple 40. In order to pressurize the tank 32 for forcing the water carried in the tank out of the nipple 40 and through the tube 30, a conventional pressurizing bulb 42 is mounted on the tank. Pressure relief valve 35 is provided on the tank for preventing overpressurizing.

After the tank 32 has been filled to approximately 4/5th of its capacity, the remaining space in the tank is pressurized by squeezing the bulb 42 so that upon opening of the valve 28 provided on the roof of the vehicle, the water will flow through the filter 38 provided in the tank 32 and out of the tank.

Positioned directly below the roof 14 of the vehicle is a drip pan 44 which collects any condensate that forms on the lower side of the roof. An electric fan 46 is centrally located with regards to the drip pan 44 for drawing air from the interior of the vehicle and feeding the air between the space provided between the top of the drip pan and the bottom of the roof. Suitable louvers 48 are provided adjacent the outer edges of the drip pan 44 for controlling the flow of air between the roof and the drip pan. A drain hose 50 is connected to the drip pan 44 and extends through an inconspicuous portion of the car for depositing any condensate collected onto the ground.

In operation, when the vehicle is setting in the sun's rays and/or the ambient heat causes the temperature of the roof of the vehicle to rise to a predetermined level, the valve 28 opens and water is forced from the tank 32 through tube 30 and then through the channels 24. The water then migrates through the porous layer 21. As the water evaporates up through the upper permeable layer 22, it produces a cooling effect on the roof of the vehicle. This, in itself, will reduce the temperature of the air of the interior of the vehicle, however, upon activating the electric fan 46, the air within the vehicle is circulated under the cool roof for more effectively reducing the temperature of the air within the vehicle.

Figure 5:
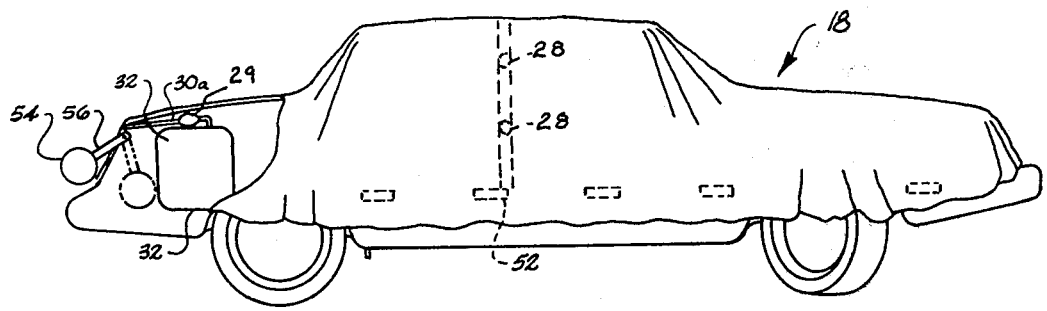
FIG. 5 is a modified form of the invention showing a composite layered cooling member draped over a vehicle with portions of the vehicle broken away to illustrate a source of water.

Instead of the apparatus being permanently connected or semi-permanently connected to the vehicle as in the above description, the composite layered material can be draped over the vehicle such as illustrated in FIG. 5. Any suitable fastening strips such as Velcro fasteners 52 can be used for securing the draped composite layered material over the vehicle. When Velcro connectors are used, one side of the Velcro strip is normally permanently fixed to the side of the vehicle. If this is undesirable to some people, magnets can be sewn into the composite layer 18 in place of the Velcro strip for securing the composite layered material to the vehicle. The entire covering can be folded and rolled on a roller provided in a cannister 54. The cannister 54 has an elongated longitudinal slit provided in a wall thereof so that once the sides of the covering are folded up onto the roof portion, it can be readily wound into the cannister 54 by manipulating a handle, not shown. The cannister 54 is suitably supported on arms 56. The inner ends of the arms 56 are pivotably connected to the inside lower wall of the trunk so that once the composite layered member has been rolled into the cannister 54, the entire cannister can be pivoted into the interior of the trunk.

The same pressurized tank 32 is used with the composite layered material shown in FIG. 5 with the exception that a conveying tube 30a is connected to one edge of the composite layered material rather than being permanently fixed into the vehicle such as shown in FIG. 1.

In addition to heat sensitive valves 28 being utilized for controlling the flow of fluid to the channels 24, a time controlled valve 29 can also be utilized. This time controlled valve can be set to open at a predetermined time. Normally, this would take place a sufficient period before the anticipated use of the vehicle so that the vehicle can be cooled. The valve 29 can also be set to close at a particular time for ensuring that the fabric is dry for storage.

While a preferred embodiment of the invention has been described using specific terms, such description is for illustrative purposes only, and it is to be understood that changes and variations may be made without departing from the spirit or scope of the following claims.

What is claimed is:

1. An apparatus for cooling objects such as vehicles comprising:
    a composite layered member coextensive with said object to be cooled including,
    (i) a protective and permeable upper layer of material;

(ii) a porous layer of material through which water migrates,
(iii) a nonporous heat absorbing under layer;
(iv) water conveying channels interposed between said porous and said under layer;
(v) openings provided in said channels providing communication between the interior of said channels and said porous layer of material;
(vi) opening provided in said protective and permeable upper layer of material for allowing water vapor to pass therethrough, and
(vii) valve means for controlling the flow of water through said channels;

a souce of water;
conduit means extending between said source of water and said layered member, and
means for forcing said water from said source of water through said channels into said porous material so that upon evaporation through said permeable layer by heat transferred from said object, said object is cooled.

2. The apparatus as set forth in claim 1 further comprising:
said composite layered member is permanently carried on the roof of said vehicle, and
a water collection pan being positioned below said roof for collecting any condensation forming on the bottom of said roof.

3. The apparatus as set forth in claim 1 further comprising:
a reflective coating provided on an outer surface of said protective layer of material for reflecting rays from the sun when said composite layer is positioned on a roof of a vehicle.

4. The apparatus as set forth in claim 1 further comprising:
said source of water being a pressurized tank of water carried in the trunk of said vehicle.

5. The apparatus as set forth in claim 4 further comprising:
baffles carried in said pressurized tank for stabilizing said water carried in said tank.

6. The apparatus as set forth in claim 1 further comprising:
said vehicle having a trunk, hood, and a roof;
said porous layer extending over at least said roof of said vehicle for cooling said roof as said water migrates through said porous layer and evaporates through said permeable layer.

7. The apparatus as set forth in claim 1 further comprising:
said composite layered member being of sufficient size to be draped over the entire vehicle to be cooled.

8. The apparatus as set forth in claim 1 further comprising:
said valve means including a temperature activated valve positioned on said object to be cooled and being opened upon said object reaching a predetermined temperature, allowing water to flow from said tank to said channels.

* * * * *